United States Patent [19]

Keat

[11] 4,116,831

[45] Sep. 26, 1978

[54] SEPARATION OF SOLIDS AND LIQUIDS

[75] Inventor: Gordon Samuel Keat, Par, England

[73] Assignee: English Clays Lovering Pochin & Company Limited, St. Austell, England

[21] Appl. No.: 762,250

[22] Filed: Jan. 25, 1977

[30] Foreign Application Priority Data

Jan. 29, 1976 [GB] United Kingdom .............. 3647/76

[51] Int. Cl.² ............................................ B01D 33/36
[52] U.S. Cl. ........................................ 210/68; 34/22; 34/130; 34/145; 34/155; 34/181; 100/211; 210/70
[58] Field of Search ............... 210/66, 67, 68, 70, 210/349, 350, 354, 355, 356, 359, 409, 410, 416; 34/22, 130, 145, 155, 181, 182, 210; 100/211

[56] References Cited

U.S. PATENT DOCUMENTS 3,549,523  12/1970  Gilard et al. .......................... 210/68

FOREIGN PATENT DOCUMENTS 907,485  12/1960  United Kingdom .................... 210/351

*Primary Examiner*—Frank Sever
*Attorney, Agent, or Firm*—Larson, Taylor and Hinds

[57] ABSTRACT

A method of reducing the liquid content of a mixture of a liquid and a particulate solid by subjecting said mixture to pressure filtration in a tube pressure filter in which, after the formation of the filter cake on the filter element of the tube pressure filter, a gas is forced through the filter cake at a pressure which is at least one third of the maximum pressure employed to form the filter cake on the filter element.

3 Claims, 1 Drawing Figure

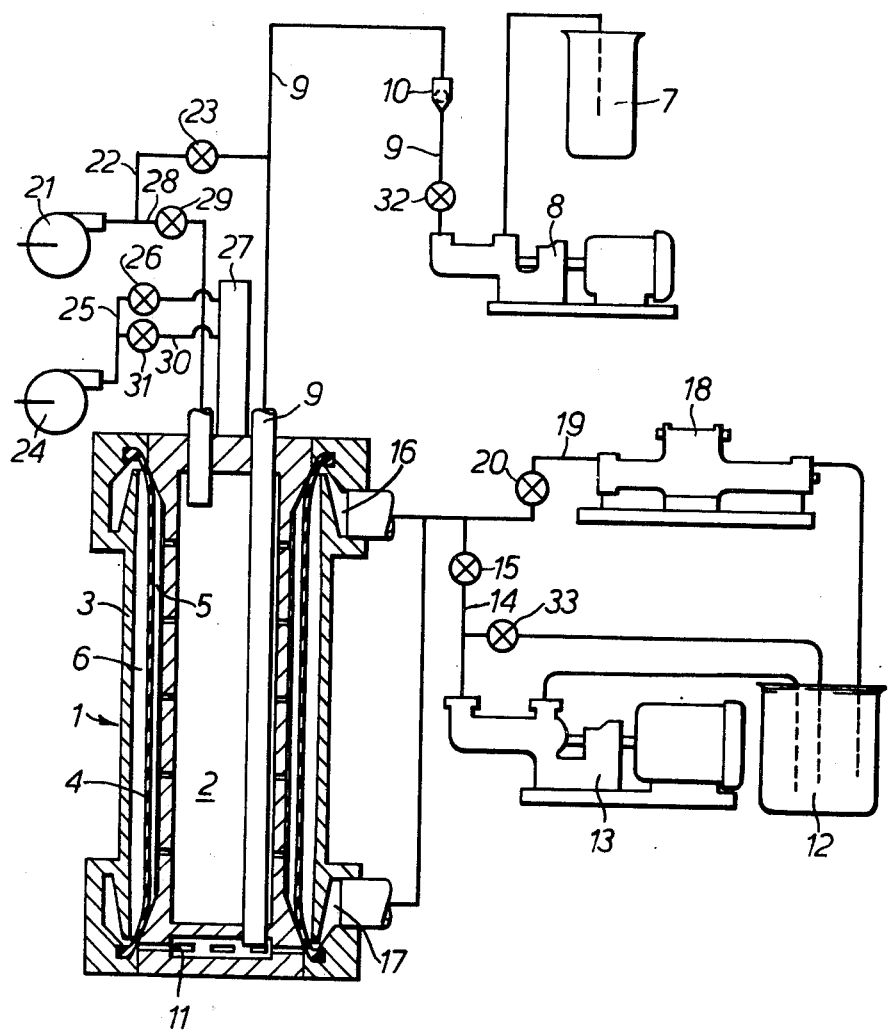

SEPARATION OF SOLIDS AND LIQUIDS

BACKGROUND OF THE INVENTION

This invention relates to the separation of solids and liquids and, more particularly but not exclusively, is concerned with a method of pressure filtering a mixture of a particulate solid and a liquid to obtain a filter cake of the particulate solid which has a low liquid content.

The liquid content of a filter cake formed when a mixture of a particulate solid and a liquid, for example in the form of a slurry, is subjected to pressure filtration decreases as the pressure applied to the slurry during filtration is increased. However, even when the applied pressure is very high, i.e. in excess of 1000 pounds per square inch gauge (p.s.i.g.) or more, the filter cake inevitably retains a certain amount of liquid in the interparticle pores within the filter cake. The amount of liquid retained depends primarily upon the porosity of the filter cake which in turn is a function of the applied pressure, the particle size distribution of the material which forms the filter cake, and the density of the particle packing.

In recent years there have been developed what are frequently known as tube pressure filters which are capable of operating at pressures in excess of 1000 pounds per square inch (p.s.i.). One kind of tube pressure filter comprises an arrangement of (a) a pair of generally coaxial tubular assemblies arranged one within the other, (b) an impermeable elastic sleeve disposed within and secured to the outer of said tubular assemblies, (c) a filter element disposed around and supported by the inner of said tubular assemblies, (d) first discharge means for the discharge of filtrate which has passed through the filter element, and (e) second discharge means for the discharge of solid material retained on said filter element, the arrangement being such that in a first operating condition of the tube pressure filter said second discharge means is closed and the tubular assemblies cooperate with each other to define a closed annular chamber which is divided into generally coaxial and non-intercommunicating inner and outer compartments by said impermeable elastic sleeve, the inner compartment having an inlet for a feed slurry comprising a mixture of liquid and a particulate solid and the outer compartment having an inlet for a hydraulic fluid under pressure, and in a second operating condition of the tube pressure filter said second discharge means is open to enable particulate solid in the form of a filter cake to be discharged from the inner compartment. Herein this kind of tube pressure filter will be referred to as "a tube pressure filter of the kind set forth". Embodiments of tube pressure filters of the kind set forth, and details of the construction and operation thereof, are given in, for example, British Pat. Specifications Nos. 907,485; 1,271,494; 1,240,465; 1,240,466; 1,317,887, 1,340,858; 1,351,142; 1,351,943; 1,355,334; 1,336,856; 1,362,655; and 1,386,256; and U.S. Pat. No. 3,900,403.

It has been suggested that dewatering of the filter cake might be assisted by passing air through the filter cake after it has been formed on the filter element and when substantially no more liquid can be expressed from the filter cake by application of the pressure exerted by the hydraulic fluid. However, there has not been described a satisfactory way of achieving this object.

SUMMARY OF THE INVENTION

According to one aspect of the present invention there is provided, in a method of reducing the liquid content of a mixture of a liquid and a particulate solid by subjecting said mixture to pressure filtration in a tube pressure filter of the kind set forth to form a filter cake of the particulate solid on the filter element of said tube pressure filter, the improvement which comprises the steps of introducing into the inner compartment of the tube pressure filter, after the formation of the filter cake on the filter element, a gas, and then pressurising hydraulic fluid in the outer compartment of the tube pressure filter to a pressure which is at least one third of the maximum pressure employed to form the filter cake on the filter element thereby to force gas through the filter cake.

It has been found that the amount of liquid retained in the pores of a filter cake can be reduced significantly by forcing gas under pressure through the cake in the same direction as the flow of filtrate during formation of the filter cake, and in the manner required by the present invention. The pressure applied by the hydraulic fluid to the gas in the inner compartment should not normally be higher than 2,000 p.s.i.g., because of the need for stronger, and therefore more expensive, vessels and conduits to contain safely gas at pressures of this magnitude, but generally a pressure in excess of 500 p.s.i.g. is desirable. The optimum pressure applied to the gas will depend upon the porosity of the material of which the filter cake is formed. The gas is most conveniently compressed air, but other gases may also be used. Furthermore the gas may, if desired, be at a temperature higher than the ambient temperature in order to remove a larger quantity of liquid from the pores of the cake. It has also been found that it is desirable to perform the steps of introducing the substantially dry gas into the inner compartment of the tube pressure filter, and then forcing it through the filter cake, at least twice (but not normally more than five times).

According to a second aspect of the present invention there is provided apparatus for removing liquid from a mixture of the liquid and a particulate solid which apparatus comprises a tube pressure filter of the kind set forth, means for introducing a pressurised gas into the inner compartment of said tube pressure filter, and means for forcing said gas through a filter cake of the particulate solid when the filter cake is supported on the filter elemeent of the tube pressure filter.

The method of the invention can be readily put into practice if there is used for the pressure filtration of the mixture of particulate solid and liquid tube pressure filters of the types described in British Pat. Specifications Nos. 907,485 and 1,240,465. These types of tube pressure filter generally comprise two coaxial tubular assemblies disposed one within the other, the inner tubular assembly having a perforated wall and a filter element disposed about the outer surface thereof, and an elastic sleeve which is secured in a liquid tight manner at each end to a corresponding end of the outer tubular assembly, the elastic sleeve thereby forming a deformable partition which separates the annular chamber formed between the inner and outer tubular assemblies into non-intercommunicating inner and outer compartments. Briefly, in the operation of these types of tube pressure filter a feed slurry is introduced into the inner compartment of the tube pressure filter in an amount sufficient to fill this compartment, and hydraulic fluid is introduced into the outer compartment to cause the elastic sleeve to expand towards the inner tubular assembly and to force liquid in the feed slurry through the filter element, thus forming on the filter element a cake consisting predominantly of the particulate solid. It is conventional practice, after the filter cake has been formed, to withdraw the hydraulic fluid from the outer compartment and then to open the tube pressure filter by displacing the tubular assemblies axially relative to one another whereafter the filter cake can be discharged by allowing it to fall off the filter medium under gravity or, where necessary, by applying one or more blasts of compressed gas to the inside of the inner tubular assembly thus causing gas to flow through the filter medium in a direction opposite to that of the filtrate. It is to be noted that normally when the hydraulic fluid is withdrawn from the outer compartment, prior to displacing the tubular assemblies axially relative to one another, the pressure in the inner compartment is reduced below atmospheric pressure as a result of the elastic sleeve being drawn back against the outer tubular assembly and this frequently results in cracking of the filter cake which facilitates the subsequent discharge thereof from the inner compartment. In accordance with the method of the present invention the tube pressure filter is modified so as to have associated therewith compressed gas supply means which preferably is constructed and arranged so that the gas is introduced into the feed conduit for the mixture to be separated and is allowed to enter the inner compartment, generally after the formation of the filter cake and when the elastic sleeve is expanded and in contact with the filter cake. The elastic sleeve is drawn back sufficiently to make room for the gas by withdrawing hydraulic fluid from the outer compartment. It may be important to ensure that the pressure in the inner compartment does not fall significantly below atmospheric pressure since in the present invention the filter cake must not crack and allow the gas to pass rapidly through the cracks without achieving the desired drying effect. The gas is therefore introduced into the inner compartment at a pressure ranging from about 30 to about 100 p.s.i.g. simultaneously with the withdrawal of the hydraulic fluid from the outer compartment, and the pressure applied to the gas is then increased to the value necessary for it to be forced through the pores of the filter cake by again supplying hydraulic fluid under pressure to the outer compartment of the tube pressure filter thus causing the elastic sleeve to expand towards the inner tubular assembly, compressing the gas and forcing it through the pores of the filter cake. If desired the elastic sleeve may be relaxed, the inner compartment filled with gas a second time, and the sleeve expanded again one or more times by pumping hydraulic fluid out of and into the outer compartment.

For a better understanding of the invention, reference will now be made, by way of example, to the accompanying drawing which shows diagrammatically an apparatus suitable for performing the method of the invention. In brief, the apparatus shown in the drawing comprises a tube pressure filter, means for supplying a feed slurry to the filter and means for introducing hydraulic fluid to the filter.

The drawing shows a tube pressure filter identified generally at 1. The tube pressure filter comprises an inner tubular assembly 2, having a central section provided with a perforated wall covered on its outer surface by a filter element (not shown), and an outer tubular assembly 3. An elastic sleeve 4 secured at its two ends in a liquid-tight manner to the outer tubular assembly divides an annular chamber formed between the inner and outer tubular assemblies into non-intercommunicating inner and outer compartments 5 and 6, respectively. A feed slurry to be pressure filtered can be drawn from a reservoir 7 by a pump 8 and delivered through a conduit 9, in which are provided an on/off valve 32 and a non-return valve 10, to feed distribution means 11 which distributes the feed slurry uniformly through a narrow annular passage between the elastic sleeve 4 and the inner tubular assembly 2 into the inner compartment 5. While feed slurry is being introduced into the inner compartment hydraulic fluid can be drawn from a reservoir 12 by a reversible, low-pressure pump 13 and delivered through a conduit 14, in which is provided a valve 15 and upper and lower inlet ports 16 and 17, to the outer compartment 6 of the tube pressure filter.

In operation of the tube pressure filter, hydraulic fluid is delivered to the outer compartment 6 at a low pressure of about 50 p.s.i.g. by means of pump 13 in an amount sufficient to expand the elastic sleeve 4 partially towards the inner tubular assembly 2. When the required amount of feed slurry has been charged to the inner compartment 5, the low pressure pump 13 is stopped, the valve 15 is closed, and hydraulic fluid at a high pressure is drawn from the reservoir 12 by a pneumatically-actuated high pressure pump 18 and is delivered to the outer compartment 6 through a conduit 19, in which there is provided a valve 20. The maximum pressure of the hydraulic fluid depends on the filtering characteristics of the feed slurry but is generally in the range of from 500 to 2,000 p.s.i.g. During this filtration process a filter cake forms on the filter element and filtrate passes through the filter cake, the filter element and the perforated wall of the inner tubular assembly and collects in the bottom of the inner tubular assembly. Compressed air at a pressure of about 5 p.s.i.g. is introduced into the inside of the inner tubular assembly to force filtrate up to a vertical siphon tube (not shown) to be discharged at the top of the pressure filter. Filtration is deemed to be complete when the siphon tube is no longer filled with filtrate and air can escape through the siphon tube. This point is indicated by a reduction in air pressure inside the inner tubular assembly. The elastic sleeve 4 is then drawn back against the outer tubular assembly by reversing the low pressure pump 13 and withdrawing hydraulic fluid back into the reservoir 12. In order to prevent the filter cake from cracking, air at a pressure of 30 p.s.i.g. is supplied from a compressor 21 through a conduit 22, which is provided with a valve 23, and is injected onto the feed conduit 9 and thence into the inner compartment 5 at the same time as the hydraulic fluid is withdrawn from the outer compartment. Hydraulic fluid at high pressure is then introduced into the outer compartment 6 by operating the high pressure pump 18 and the air in the inner compartment is forced through the filter cake. The steps of withdrawing the elastic sleeve, against the outer tubular assembly, simultaneously filling the inner compartment with air, and thereafter supplying hydraulic fluid at high pressure to the outer compartment to force the air through the filter cake may be repeated if desired in order to displace more liquid from the pores of the filter cake; but it is generally not advantageous to perform more than three such cycles.

The inner compartment of the tube pressure filter is then opened by supplying air from a compressor 24 at a pressure of about 80 p.s.i.g. through a conduit 25 and valve 26 to the upper port of a pneumatic ram 27 which displaces the inner tubular assembly axially downwards. When the inner compartment of the tube pressure filter is open the filter cake may be discharged, either by simply allowing it to fall from the filter element under gravity or alternatively, by delivering one or more blasts of compressed air to the inside of the inner tubular assembly from the compressor 21 through a conduit 28 and a valve 29. When the cake has been discharged the inner compartment of the tube pressure filter is closed by supplying compressed air from the compressor 24 through a conduit 30 and a valve 31 to the lower port of the pneumatic ram 27. The tube pressure filter is now ready for the start of a new cycle.

The invention will now be further illustrated by the following Examples in which there was used apparatus similar to that described above with reference to the accompanying drawing.

EXAMPLE 1

A slurry containing 20% by weight of an English china clay (having a particle size distribution such that 43% by weight consisted of particles having an equivalent spherical diameter smaller than 2 microns and 14% by weight consisted of particles having an equivalent spherical diamter larger than 10 microns) was fed to the inner compartment of a tube pressure filter of the type described above and dewatered therein. The maximum pressure of the hydraulic fluid which was introduced into the outer compartment 6 was 1200 p.s.i.g. When the flow of filtrate had stopped the elastic sleeve 4 was drawn back against the outer tubular assembly and simultaneously air was introduced into the inner compartment 5 at a pressure of about 80 p.s.i.g. Hydraulic fluid was then introduced into the outer compartment 6 at a pressure of 1200 p.s.i.g. to force the air in the inner compartment 5 through the filter cake. The steps of withdrawing the elastic sleeve 4, introducing air at 80 p.s.i.g. into the inner compartment 5, and forcing the air through the filter cake were repeated a further two times and the filter cake was then discharged and found to have a moisture content of 13.6% by weight.

By comparison a cake formed from the same slurry of china clay in the tube pressure filter at the same hydraulic pressure of 1,200 p.s.i.g., but discharged in a conventional manner immediately after its formation and without having air forced through it in accordance with the present invention had a moisture content of 17% by weight.

EXAMPLE 2

A slurry containing 27% by weight of an English china clay (having a particle size distribution such that 38% by weight consisted of particles having an equivalent spherical diameter smaller than 2 microns and 25% by weight consisted of particles having an equivalent spherical diameter larger than 10 microns) was fed to the inner compartment 5 of a tube pressure filter of the type described above and dewatered therein. The maximum pressure of the hydraulic fluid which was introduced into the outer compartment 6 was 1500 p.s.i.g. When the flow of filtrate had stopped, all feed slurry in conduit 9 was purged from this conduit through a by-pass (not shown) to the non-return valve 10 whilst the outer compartment 6 meanwhile was still connected to the high pressure hydraulic fluid pump 18. Thereafter a supply of air at 80 p.s.i.g. was connected to the feed conduit 9. Valve 20 was then closed and valve 15 and by-pass valve 33 were opened so that the pressure of the air in the inner compartment 5 acting against the elastic sleeve 4 expelled the hydraulic fluid from the outer compartment 6 thus allowing the elastic sleeve 4 to fall back against the inner wall of the outer tubular assembly and the inner compartment to fill with air. Hydraulic fluid was then reintroduced into the outer compartment 6 at a pressure of 800 p.s.i.g. to force air in the inner compartment through the filter cake. The hydraulic fluid was then withdrawn from the outer compartment and the filter cake discharged and its moisture content measured.

The experiment was then repeated four times following the same procedure as above except that the steps of introducing air at 80 p.s.i.g. into the inner compartment 5 and forcing the air through the cake by supplying hydraulic fluid at 800 p.s.i.g. to the outer compartment 6 were performed two, three, four and five times respectively. A further experiment was performed in which a filter cake was formed from the same slurry of china clay in the tube pressure filter at the same hydraulic pressure of 1500 p.s.i.g. but discharged in a conventional manner immediately after its formation and wihtout having air forced through it in accordance with the invention. The results are set forth in Table 1 below.

TABLE 1

| Number of times air forced through filter cake | Moisture content (% by wt.) |
| --- | --- |
| 0 | 17.6 |
| 1 | 13.3 |
| 2 | 11.8 |
| 3 | 11.6 |
| 4 | 11.8 |
| 5 | 11.7 |

These results show that, for this particular china clay, the minimum cake moisture content is reached after two cycles of forcing air through the cake.

EXAMPLE 3

A slurry containing 27% by weight of an English china clay (having a particle size distribution such that 80% by weight consisted or particles having an equivalent spherical diamter smaller than 2 microns and 0.1% by weight consisted of particles having an equivalent spherical diameter larger than 10 microns) was fed to the inner compartment of a tube pressure filter of the type described above and dewatered thereon. The maximum pressure of the hydraulic fluid which was introduced into the outer compartment was 1500 p.s.i.g. When the flow of filtrate has stopped, air at 85 p.s.i.g. was admitted into the inner compartment in the manner described in Example 2. Hydraulic fluid was then introduced into the outer compartment at a pressure of 1500 p.s.i.g. to force the air in the inner compartment through the filter cake. The cake was discharged and the weight and moisture content of the cake was determined. The total time taken to perform all the operations which were needed to form and discharge the filter cake was also recorded and the weight of dry china clay which could be produced by the tube pressure filter in one hour was calculated.

The experiment was then repeated following the same procedure as above except that the steps of introducing air at 85 p.s.i.g. into the inner compartment and forcing the air through the filter cake by supplying hydraulic fluid at 1500 p.s.i.g. to the outer compartment were performed a total of four times, The weight and moisture content of the cake which was finally discharged were determined, the total time taken to perform all the operations recorded and the rate of production of dry china clay again calculated.

A further experiment was then performed in which a filter cake was formed from the same slurry of china clay in the tube pressure filter at the same hydraulic pressure of 1500 p.s.i.g. but discharged in the conventional manner immediately after its formation and without having air forced through it in accordance with the invention. The weight and moisture content of the cake were determined, the total time taken to perform all the operations recorded and the rate of production of dry china clay calculated as before. The results are set forth in Table II below:

TABLE II

| Number of times air forced through filter cake | Moisture content (% by wt) | Wt of cake (kg) | Total time taken (min.) | Kg of bone dry china clay per hour |
|---|---|---|---|---|
| 0 | 19.9 | 14.3 | 11.75 | 58.5 |
| 1 | 16.3 | 15.0 | 12 | 62.6 |
| 4 | 14.1 | 14.5 | 16.75 | 44.7 |

These results show that, in the case of this particular grade of china clay, forcing air through the filter cake once brings about not only a reduction of the moisture content of the cake which is eventually discharged but also an increase in the rate of production of dry cina clay. Forcing air through the cake four times brings about a further reduction in the moisture content but at the expense of a reduced rate of production of dry china clay because of the increased time taken by the multiple operations of filling the inner compartment with air and forcing the air through the cake.

EXAMPLE 4

The slurry or china clay which was used in Example 2 was dewatered in the same tube pressure filter. The maximum pressure of the hydraulic fluid which was introduced into the outer compartment was 200 p.s.i.g. When the flow of filtrate had stopped the supply of air at a pressure of 80 p.s.i.g. was connected to the feed conduit and the inner compartment was filled with air as described in Example 2. Hydraulic fluid was then reintroduced into the outer compartment and the pressure was gradually increased until the air was just forced through the filter cake. The pressure of the hydraulic fluid at this point was then recorded.

The experiment was then repeated a further five times, the maximum pressure of the hydraulic fluid which was introduced into the outer compartment during the initial cake-forming step being 400; 800; 1,200; 1,500 and 2,000 p.s.i.g. respectively. In each case the minimum pressure of the hydraulic fluid which was necessary just to force the air through the cake was recorded. The results are set forth in Table III below.

TABLE III

| Hydraulic fluid pressure during cake-forming stage (p.s.i.g.) | Minimum Hydraulic fluid pressure to force air through cake (p.s.i.g.) |
|---|---|
| 200 | 140 |
| 400 | 150 |
| 800 | 300 |
| 1200 | 600 |
| 1500 | 650 |

TABLE III-continued

| Hydraulic fluid pressure during cake-forming stage (p.s.i.g.) | Minimum Hydraulic fluid pressure to force air through cake (p.s.i.g.) |
|---|---|
| 2000 | 1200 |

These results show that, for china clay, the hydraulic fluid pressure necessary to force the air through the filter cake is at least on-third of the hydraulic fluid pressure which was applied during the cake forming stage.

EXAMPLE 5

A slurry containing 13.6% by weight of synthetic fibre polymer granules in water was dewatered in a tube pressure filter of the type described above, the temperature of the suspension first being raised to 45° C. The particle size distribution of the granules was such that a trace was retained on a sieve of aperture 0.700 mm, 1.6% by weight was retained on a sieve of aperture 0.250 mm and 74% by weight was retained on a sieve of aperture 0.053 mm. When the flow of filtrate had stopped the inner compartment was filled with air in the manner described in Example 2 and the air was expressed through the filter cake by reintroducing into the outer compartment hydraulic fluid at 800 p.s.i.g. The hydraulic fluid was then withdrawn and the cake discharged and its moisture content measured. The experiment was then repeated following the same procedure as above except that the steps of introducing air into the inner compartment and forcing the air through the cake were performed three times before the cake was discharged. Finally the experiment was repeated but the steps of introducing air into the inner compartment and forcing the air through the cake were omitted. The results are set forth in Table IV below.

TABLE IV

| Number of times air forced through filter cake | Moisture content (% by wt.) |
|---|---|
| 0 | 32.2 |
| 1 | 20.9 |
| 3 | 18.3 |

I claim:

1. A method of reducing the liquid content of a mixture of a liquid and a particulate solid, which method comprises feeding a slurry of said mixture into the inner compartment of a tube pressure filter in an amount sufficient to fill said compartment; said tube pressure filter comprising an arragnement of a pair of generally coaxial tubular assemblies arranged one within the other, (b) an impermeable elastic sleeve disposed within and secured to the outer of said tubular assemblies, (c) a filter element disposed around and supported by the inner of said tubular assemblies, (d) first dishcarge means for the discharge of filtrate which has passed through the filter element, and (e) second discharge means for the discharge of solid material retained on said filter element, the arrangement being such that in a first operating condition of the tube pressure filter said second discharge means is closed and the tubular assemblies cooperate with each other to define a closed annular chamber which is divided into generally coaxial and non-intercommunicating inner and outer compartments by said impermeable elastic sleeve, the inner compartment having an inlet for a feed slurry comprising a mixture of liquid and a particulate solid and the outer compartment having an inlet for a hydraulic fluid under pressure, and in a second operating condition of the tube pressure filter the second discharge means is open to enable particulate solid in the form of a filter cake to be discharged from the inner compartment; introducing hydraulic fluid into the outer compartment of said tube pressure filter to cause the elastic sleeve to expand towards the inner tubular assembly of the tube pressure filter, thereby to force liquid through the filter element of the tube pressure filter and form on the filter element a filter cake of the particulate solid; thereafter withdrawing the hydraulic fluid from the outer compartment whilst simultaneously introducing into the inner compartment of the tube pressure filter a gas at a pressure ranging from about 30 to about 100 p.s.i.g.; whereby cracking of the filter cake is prevented; and thereafter increasing the pressure applied to the gas to a value necessary for it to be forced through the pores of the filter cake by again supplying to said outer compartment hydraulic fluid under a pressure ranging from about 500 to about 2,000 p.s.i.g. thereby causing the elastic sleeve to expand towards said inner tubular assembly, to compress the gas and force it through the pores of the filter cake.

2. In a method of reducing the liquid content of a mixture of a liquid and a particulate solid by subjecting said mixture to pressure filtration in a tube pressure filter to form a filter cake wherein the tube pressure filter comprises an arrangement of (a) a pair of generally coaxial tubular assemblies arranged one within the other, (b) an impermeable elastic sleeve disposed within and secured to the outer of said tubular assemblies, (c) a filter element disposed around and supported by the inner of said tubular assemblies, (d) first discharge means for the discharge of filtrate which has passed through the filter element, and (e) second discharge means for the discharge of particulate solid retained on said filter element, the arrangement being such that in a first operating condition of the tube pressure filter said second discharge means is closed and the tubular assemblies cooperate with each other to define a closed annular chamber which is divided into generally coaxial and non-intercommunicating inner and outer compartments by said impermeable elastic sleeve, the inner compartment having an inlet for a feed slurry comprising a mixture of liquid and a particulate solid and the outer compartment having an inlet for a hydraulic fluid under pressure, and in a second operating condition of the tube pressure filter a second discharge means is open to enable particulate solid in the form of a filter cake to be discharged from the inner compartment, and wherein said method comprises feeding a slurry of said mixture to the inner compartment of the tube pressure filter, introducing said hydraulic fluid under pressure to the outer compartment of the tube pressure filter to cause said impermeable elastic sleeve to expand towards the inner tubular assembly, thereby forcing liquid in said mixture through said filter element and forming on the filter element a filter cake of the particulate solid, and thereafter withdrawing said hydraulid fluid from the outer compartment of the tube pressure filter, the improvement which comprises simultaneously with the withdrawal of said hydraulic fluid from the outer compartment introducing a gas into the inner compartment of the tube pressure filter under a pressure sufficient to maintain a super atmospheric pressure in the inner compartment whereby cracking of the filter cake is prevented and, and then, introducing hydraulic fluid in the outer compartment of the tube pressure filter at a pressure which is at least one third the maximum pressure of the hydraulic fluid employed to form the filter cake on the filter element and is in the range of from about 500 to 2000 p.s.i.g. thereby to force the gas through the filter cake, the pressure in the inner compartment being prevented from falling significantly below atmospheric pressure until said gas has been forced through the filter cake.

3. A method according to claim 2, wherein the steps of withdrawing hydraulic fluid from the outer compartment and simultaneously introducing gas into the inner compartment of the tube pressure filter and of thereafter forcing said gas through the filter cake, are performed at least twice.

* * * * *